Figure 1:
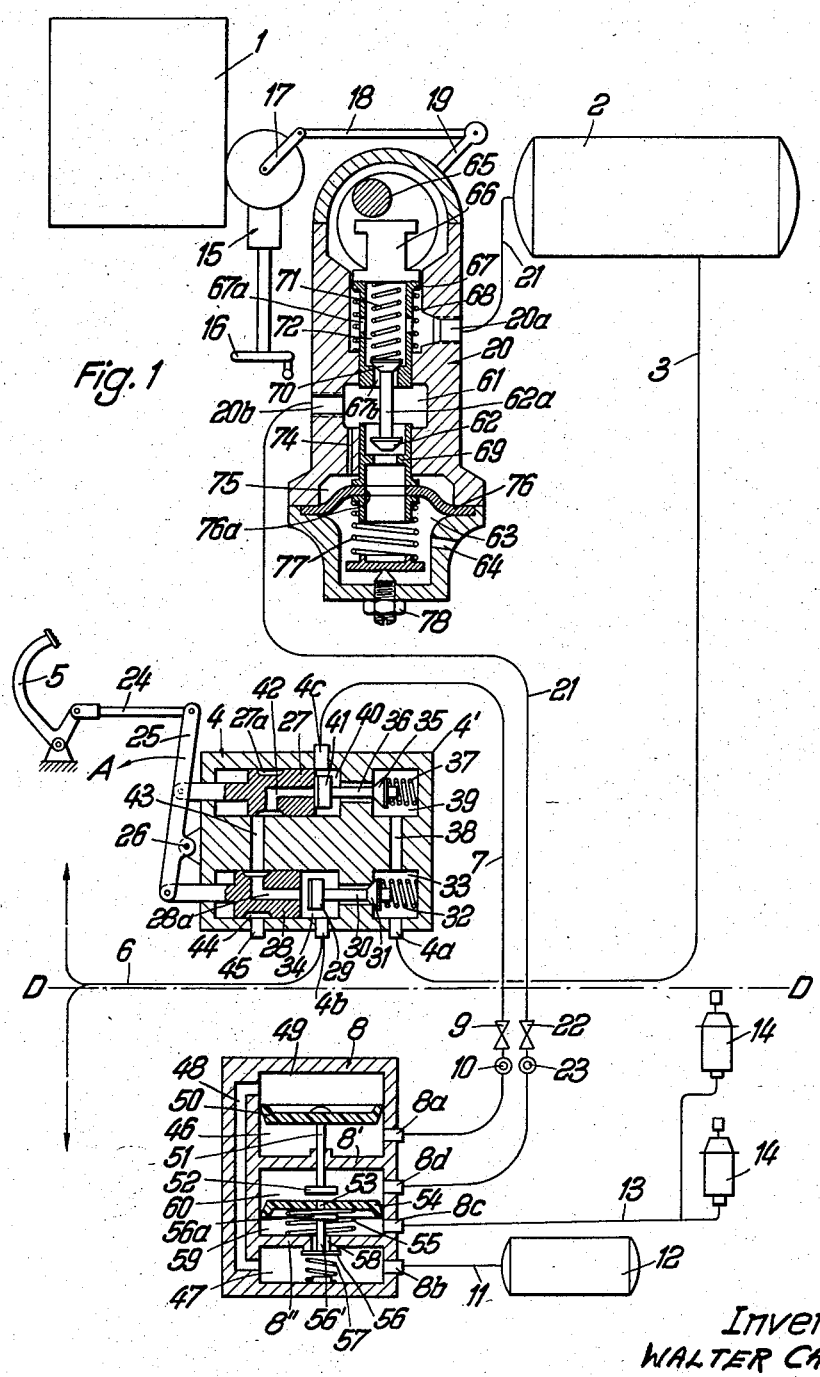

Feb. 17, 1959 W. CAMBEIS 2,874,002
DUAL BRAKE SYSTEMS FOR AUTOMOTIVE VEHICLES
Filed April 23, 1957 2 Sheets-Sheet 1

Inventor:
WALTER CAMBEIS

United States Patent Office 2,874,002
Patented Feb. 17, 1959

2,874,002

DUAL BRAKE SYSTEMS FOR AUTOMOTIVE VEHICLES

Walter Cambeis, Essen, Germany, assignor to Fried. Krupp Motoren- und Kraftwagenfabriken G. m. b. H., Essen, Germany Application April 23, 1957, Serial No. 654,593

Claims priority, application Germany December 21, 1951

11 Claims. (Cl. 303—2)

The present invention relates to brake systems for automotive vehicles, and in particular to dual brake systems for use in connection with road-riding tractor-trailer combination vehicles driven by internal combustion engines, e. g. heavy duty trucks and the like. The instant application is a continuation-in-part of a copending patent application Serial No. 322,712, filed November 26, 1952, now abandoned.

Trucks generally are provided with a pneumatic or hydraulic brake system by means of which the friction brakes of the tractor and of the trailer can be actuated jointly. This holds true not only for saddle-type tractor-trailer combinations in which the tractor, which has at least two axles, is not provided with a utilizable freight-carrying surface while the trailer, which has at least one axle at its rear end only, has its front end saddled or supported on the rear end of the tractor, but also for combinations in which the tractor is itself a freight-carrying vehicle while the trailer, which has axles at both its front and rear ends, is merely hooked to the rear end of the tractor.

For controlling the actuation of these friction brakes there is usually provided on the tractor a main braking valve and on the trailer a trailer valve. Further, on the tractor is located a main compressed air reservoir, and in many cases an auxiliary compressed air reservoir is located on the trailer. Separate conduits normally vented or subjected to reduced pressure lead, respectively, from the main braking valve, which is connected to the main reservoir by means of a suitable pressure line, to the cylinders of tractor friction brakes and to the trailer valve, the latter in turn being connected through suitable lines with the cylinders for the trailer friction brakes.

Under normal circumstances, the various friction brakes are applied by depression of a brake pedal on the tractor to operate the main braking valve so as to permit compressed air to flow from the main reservoir to the tractor brake cylinders and so as to simultaneously subject to an increased pressure the line leading to the trailer valve which in turn conducts compressed air to the trailer brake cylinders. Upon release of the brake pedal by the driver, the main braking valve is returned to its starting position and thus vents the lines leading to the brake cylinders of the tractor and to the trailer valve, whereby the braking action is terminated.

Further, other brake systems have become known in which, while the truck is being driven, the lines leading from the main braking valve to the tractor brake cylinders are vented while the line leading from the main braking valve to the trailer valve is under pressure, the system being such that communication is established between the main reservoir and the auxiliary reservoir on the trailer through both the main braking valve and the trailer valve so as to charge the auxiliary reservoir with compressed air.

When the brake pedal for such a system is depressed, compressed air flows from the main reservoir through the main braking valve to the tractor brake cylinders while the line leading from the main braking valve to the trailer valve is vented, i. e., subjected to a reduction in pressure. In this manner the trailer valve is so operated that on the trailer compressed air flows from the auxiliary reservoir through the trailer valve itself to the trailer brake cylinders so as to actuate the trailer friction brakes. When the brake pedal is released, the lines leading from the main braking valve to the tractor brake cylinders are again vented and simultaneously the line leading from the main braking valve to the trailer valve is subjected to pressure.

As a result of this operation, the lines leading from the trailer brake cylinders to the trailer valve are vented, while the communication between the main and auxiliary compressed air reservoirs via the main braking valve and the trailer valve is reestablished for the purpose of recharging the auxiliary reservoir.

Since it has become known in the case of heavy duty trucks, especially tractor-trailer combinations, that during movement on relatively long descents or steep downward grades the conventional friction brakes become greatly overheated and thus fail to provide the necessary large braking action, there have been developed auxiliary brakes which act independently of the friction brakes. By way of example, it has been proposed to increase the braking action of the motor or engine of the truck by blocking of the exhaust conduit. Alternatively, electric brakes working on the eddy current principle are employed. A particularly effective auxiliary braking operation is attained in the case of D. C.-energized, two-cycle engines by varying the rotation of the camshaft of the engine so as to transform the latter into a compressor driven by the vehicle wheels.

Each of these auxiliary brakes, however, operates only on the tractor so that the latter, upon actuation of the auxiliary brake, must take up the entire pushing force exerted by the trailer as the latter due to its momentum tends to overtake or pile up on the tractor, which is a great peril to safe driving conditions since it may lead to jackknifing of the trailer across the load, an occurrence which invariably leads to severe accidents.

It is, therefore, one of the principal objects of the present invention to provide means contributing to improvement in and enhancement of the degree of safety of operation of road-riding tractor-trailer combination vehicles in normal traffic and during movement along extended relatively steep downward grades.

It is another object of the present invention to provide means affording a dual brake system for a road-riding tractor-trailer combination driven by an internal combustion engine, which system is constructed to permit application of the trailer friction brakes either when the friction brakes of the tractor are applied by the driver or when the latter, without applying the tractor friction brakes, actuates the engine in such a manner as to cause it to act as a compressor and brake.

A further object of the present invention is the provision of means facilitating regulation, within very wide limits, of the operational characteristics of that part of the dual brake system connected only to the trailer friction brakes and actuatable by an auxiliary tractor brake acting independently of the tractor friction brakes.

A related object of the present invention is to provide means enabling the trailer friction brakes to be applied only to a limited extent in response to operation of the auxiliary brake without application of the tractor friction brakes, whereby the entire combination vehicle can be braked for long periods of time without engendering overheating of the trailer friction brakes.

Still a further object of the present invention is, therefore, the provision of means rendering it possible to prevent overheating of the friction brakes of both the tractor and the trailer despite the fact that continued braking of the combination vehicle during movement thereof along a steep downward grade is necessary and carried out.

Concurrently, it is another object of the present invention to provide means conducive to minimizing or substantially eliminating any thrust exerted by the trailer on the tractor during movement of the entire vehicle along a steep downward grade, whereby the combination is kept in a straight condition and the tendency of the trailer to pile up on the tractor or jackknife across the road is almost completely inhibited.

Yet another object of the present invention is the provision of means enabling avoidance of the disadvantages and drawbacks which are generally found in heretofore employed tractor-trailer vehicle brake systems regardless of whether or not such systems are provided with auxiliary brake means for the tractor, e. g. an engine capable of operating as a compressor and brake.

More particularly, the dual brake system according to the present invention leads to the required driving safety and an improvement in the driving characteristics of tractor-trailer trucks and like vehicles by virtue of the fact that the actuating means for the auxiliary brake, i. e., the "motor brake" or "engine brake," are so coupled with the actuating means for the trailer friction brakes that concurrently with the braking of the tractor by the auxiliary brake the trailer is automatically braked also. This is most advantageously effected, in the case of pneumatic or hydraulic brake systems, by means of a line bypassing the main braking valve and leading from the main pressure fluid reservoir directly to the trailer valve controlling the trailer brakes, which line contains a regulating device, preferably also a valve, acted on by the actuating means for the auxiliary brake.

Thus, the kinematic characteristics of the coupling between the actuating means for the auxiliary brake and the aforesaid regulating device can be easily adjusted in such a manner that the characteristics of the trailer brakes are adapted to or matched with the characteristics of the auxiliary brake. In this manner it is possible to attain the advantageous result that the trailer exerts no appreciable pushing forces or thrusts on the tractor and that the pulling forces exerted by the trailer on the tractor are only so large as to ensure that the tractor-trailer combination is maintained in the straight-line condition necessary for driving safety.

While driving on long downward grades it is, therefore, possible by actuating the auxiliary brake of the tractor and by correspondingly adjusting the control valve to bring about a limited braking of the trailer so that the trailer friction brakes do not become overheated, whereby they are able to exert a full braking action when at the end of the downward grade a complete stopping of the vehicle is required.

Figure 2:
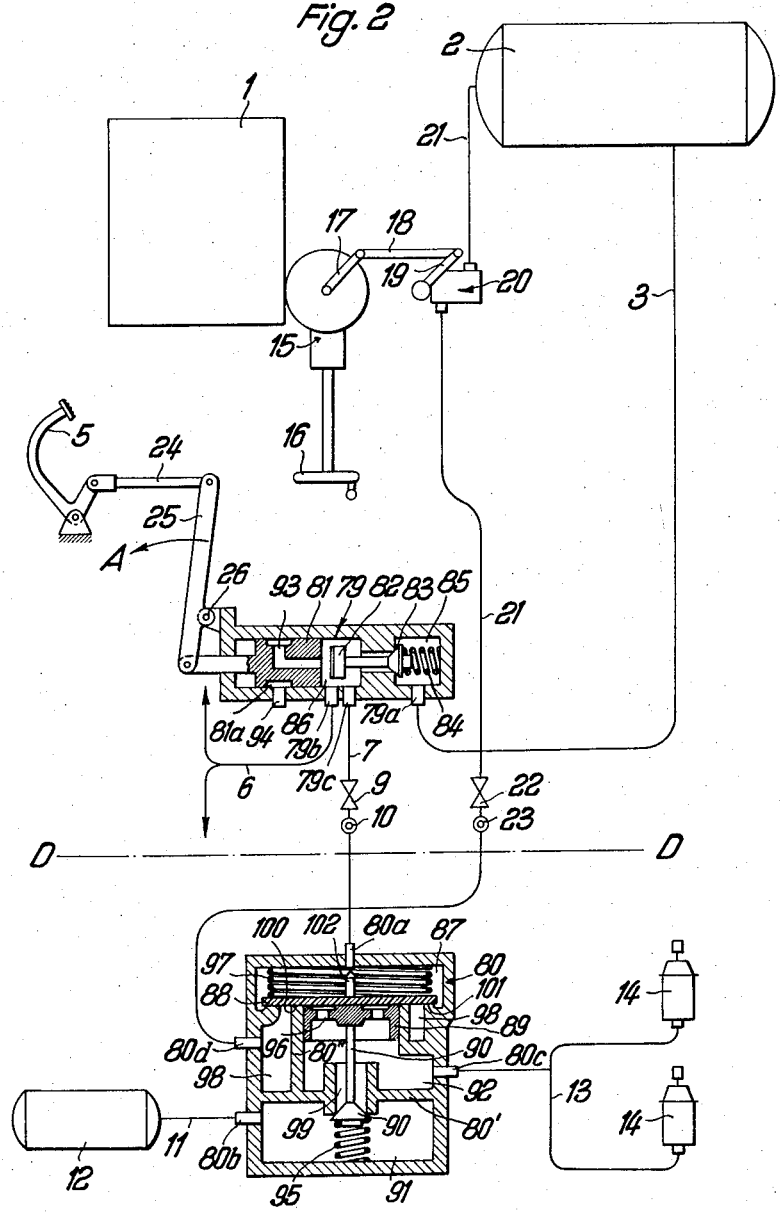

These and other objects and advantages of the present invention will become more clear from the following description when taken in conjunction with the accompanying drawings, in which:

Fig. 1 is a schematic, partly sectional illustration of one embodiment of the dual brake system constructed in accordance with the invention and designed for use with tractor-trailer combinations in which a reduction of pressure in the line leading from the main braking valve to the trailer valve is employed for the purpose of actuating the trailer friction brakes; and Fig. 2 is a similar schematic, partly sectional illustration of another embodiment of the dual brake system constructed in accordance with the invention and designed for use with tractor-trailer combinations in which an increase of the pressure in the line from the main braking valve to the trailer valve is employed to actuate the trailer friction brakes.

Referring now more particularly to Fig. 1, it will be seen that the tractor (not shown but located above the dot-dash line D—D) is provided with a motor or engine 1 which has a camshaft (not shown). On the tractor is mounted a main compressed air reservoir 2 which is connected through a line 3 to a port 4a of the main braking valve 4 constructed to be actuated by a brake pedal 5 in a manner to be more fully described hereinafter.

From a port 4b of the main braking valve 4, a line 6 leads to the brake cylinders (not shown) for the front and rear friction brakes of the tractor. Connected to a port 4c of the main braking valve is a line 7 the other end of which is connected to a port 8a of a trailer valve 8 mounted on the trailer (not shown but located below line D—D), a shut-off valve 9 and a coupling 10 being incorporated in the line 7 between the tractor and the trailer. The trailer valve 8 communicates through a port 8b with a line 11 leading to an auxiliary compressed air reservoir 12, a line 13 leading to the trailer brake cylinders 14 being connected to a port 8c of the trailer valve.

The tractor engine 1, if of the internal combustion type, also constitutes the auxiliary brake means for the tractor by being operable as a compressor. The actuating means for causing the engine to operate in this manner is generally designated at 15. In the illustrated embodiment of the invention, there is included as part of the actuating means 15 a handwheel 16 easily accessible to the driver when in driving position, but it is to be realized that the means 15 may be operated by an electric motor or other types of operating means in lieu of the manipulating means represented by the handwheel.

In general, the actuating means 15 consists of a worm gear transmission, although a different type of transmission may be employed, by means of which the condition of rotation of the camshaft of the engine can be so changed that the engine is transformed into a compressor. Nevertheless, it is intended that any other type of auxiliary brake means working independently of the tractor friction brakes and not connected with the engine may be employed.

The actuating means 15 is connected by means of a crank 17 and a link 18 to an adjustment lever 19 of a precision regulating valve 20, which will be referred to hereinafter by the term "control valve," incorporated in a line 21 leading from the main reservoir 2 to a port 8d of the trailer valve 8 and bypassing the main braking valve 4. The line 21 is provided with a shut-off valve 22 and a coupling 23 between the tractor and the trailer.

The main braking valve 4 includes a housing or block 4' to which is pivoted at 26 a lever 25 one end of which is connected via a link 24 to the brake pedal 5. Pivoted to the lever 25 on opposite sides of the pivot point 26 thereof are two reciprocal slide valve members 27 and 28 arranged in respective cavities of the block or housing 4'. The valve member 27 is provided with an axial bore 42 communicating with an annular external groove 27a, while the valve member 28 is provided with an axial bore 28a communicating with an annular external groove 44.

Provided in the housing 4' is a chamber 33 communicating at one side with the port 4a and at the other side with a bore 38 leading to a chamber 39. A conical valve 31 is mounted in the chamber 33 and pressed against its seat by a spring 32, the valve cone being connected by means of a rod 30 to a valve head 29 located in a chamber 34 defined by the valve member 28 in the cavity in which it is located.

A conical valve 35 is located in the chamber 39 and biased toward its seat by a spring 37, a rod 36 connecting the valve cone 35 to a valve head 41 located in a chamber 40 defined by the valve member 27 in the cavity in which it is arranged, the chamber 40 communicating with the port 4c. A bore 43 establishes communication between the two cavities in which the valve members 27 and 28 are arranged, the chamber 34 communicating with the port 4b and the valve housing being additionally provided with a port 45 leading from the cavity housing the valve member 28 to the atmosphere.

The trailer valve 8 includes a housing provided with two transverse partitions 8' and 8". A piston 50 divides the space above the partition 8' into two chambers 46 and 49, and a piston 54 provided with a central aperture 53 and biased toward the partition 8' by a compression spring 55 divides the space between the partitions into two chambers 59 and 60. A chamber 47 formed in the trailer valve housing beneath the partition 8" communicates with the chamber 49 through a bore 48.

The pistons 50 and 54 may be made in toto of suitable elastic materials, such as leather, synthetic plastics and the like, or they may each have a center section of metal and only the outer peripheries made of the aforesaid elastic materials. Alternatively, if the pistons be made entirely of such elastic materials, they may have their centers reinforced by metal discs affixed thereto in any suitable manner. As will be readily seen, the pistons are so constructed that compressed air could flow past the same in one direction but not in the opposite direction. Thus, air could flow from the chamber 46 to the chamber 49 but not from the latter into the chamber 46.

Fixed to the piston 50 and extending slidably through the partition 8' is a stem 51 carrying a valve element 52 for controlling the aperture 53 in the piston 54. The partition 8" is provided with a central passageway 58 through which extends a stem 56' of a valve 56 which is biased upwardly by a spring 57 against the partition 8" so as to close the passageway 58. The stem 56' carries a head 56a at its upper end. The chambers 47, 59, 60 and 46 communicate with the ports 8b, 8c, 8d and 8a, respectively.

The control valve 20 includes a housing having ports 20a and 20b to which the adjacent parts of the line 21 are connected. In the uppermost part of the control valve housing is mounted an eccentric 65 operable to engage a push rod or like transmission element 66 mounted on a hollow bushing 67 provided intermediate its ends with a plurality of circumferentially spaced apertures 67a. A spring 68 mounted in a cavity communicating with the port 20a surrounds and biases the bushing 67 upwardly.

The bushing 67 is provided at its end remote from the transmission element 66 with an axial bore 67b controlled by a conical valve 70 arranged in the chamber 72 formed by the hollow interior of this bushing, a spring 71 arranged in the bushing biasing the valve 70 toward its closing position. A stem 62a extends from the valve cone 70 through the bore 67b and a central chamber 61 communicating with the port 20b and terminates in a conical valve 62 arranged to control an axial opening in a bushing 69 slidably mounted in the control valve housing and supported by a diaphragm 76 which divides the portion of the housing below the chamber 61 into two additional chambers 75 and 63, the chamber 75 communicating with the chamber 61 through a bore 74.

The diaphragm 76 is provided with a central aperture 76a aligned with the hollow interior of the bushing 69 and is biased upwardly by a spring 77 adjustable by means of an adjustment screw 78. The chamber 63 communicates with the atmosphere through a port 64.

The operation of the dual brake system shown in Fig. 1 is as follows:

As long as the truck is being driven, the dual brake system according to the invention is in the condition illustrated in Fig. 1. In the main braking valve, therefore, the valve head 41 is in engagement with the valve member 27 so that the valve cone 35 is displaced off its seat, establishing communication between the chambers 39 and 40. The chambers 33 and 34 are isolated from each other by the valve cone 31, while the chamber 34 is in communication with the atmosphere via the central bore 28a and annular groove 44 of the valve member 28 and the port 45. In this position of the main braking valve 4, the auxiliary reservoir 12 on the trailer is charged with compressed air from the main reservoir in the following manner:

Compressed air flows from the main reservoir through the line 3 into the chamber 33 and thence through the bore 38 into the chamber 39. From the latter it flows over the lifted valve cone 35, through the chamber 40 and port 4c, and through the line 7 into the chamber 46 of the trailer valve 8 via port 8a. Some of the compressed air then flows past the piston 50, i. e., around its outer peripheral edge, into the chamber 49 and thence through the bore 48, the chamber 47, the port 8b and the line 11 into the auxiliary reservoir 12, charging the same for future braking action.

Upon depression of the brake pedal 5 to actuate the tractor friction brakes, the lever 25 is pivoted in the direction of the arrow A through the intermediary of the link 24. Accordingly, the piston-like valve member 27 is displaced to the left and the piston-like valve member 28 to the right. During this movement, the member 28 comes into contact with the valve head 29 and thus lifts the conical valve 31 from its seat against the force of the spring 32. As a result, compressed air flows from the main reservoir 2 through the line 3 and port 4a into the chamber 33 and thence to the chamber 34 from which it flows through the port 4b and the line 6 connected thereto to the tractor brake cylinders so as to actuate the tractor friction brakes.

Simultaneously, the conical valve 35 is pushed against its seat by the spring 37, interrupting the communication between the main reservoir 2 and the chamber 40 which theretofore was, as previously described, effected through the line 3, port 4a, chamber 33, bore 38 and chamber 39. Upon further movement of the valve member 27 in the indicated direction, it is separated from the valve head 41 establishing communication between the chamber 40 and the axial bore 42 in the valve member 27. Thus, the line 7 connected to the trailer valve 8 is vented to the atmosphere through the chamber 40, the bore 42, the annular groove 27a, the bore 43, the annular groove 44 on the valve member 28 and the port 45.

By virtue of the resulting pressure drop in the line 7, the pressure in the chamber 46 of the trailer valve 8 decreases also. Compressed air, however, flows from the auxiliary reservoir 12 through the line 11, the port 8b, the chamber 47 and the bore 48 into the chamber 49 above the piston 50 and thus presses the latter together with its valve 52 downwardly. No air can, of course, flow from chamber 49 to chamber 46. The opening 53 in the piston 54 is thus closed and the latter pressed downwardly against the force of the spring 55.

Since the piston 54 now contacts the head 56a of the valve stem 56', the valve 56 is pressed downwardly against the force of the spring 57 and opens the passageway 58 between the chambers 59 and 47. Compressed air from the auxiliary reservoir 12 can now flow through the line 11, the port 8b, the chamber 47, the passageway 58, the chamber 59, the port 8c and the line 13 to the trailer brake cylinders 14 for actuating the trailer friction brakes. The latter, consequently, are applied together with the tractor friction brakes.

Upon release of the brake pedal 5, the valve members 27 and 28 are returned to their positions illustrated in Fig. 1. As a result, the line 6 is vented to the atmosphere through the chamber 34, the bore 28a in the valve member 28, the annular groove 44 and the port 45. Simultaneously, engagement of the valve member 27 with the valve head 41 effects lifting of the conical valve 35 from its seat through the intermediary of the rod 36, whereby compressed air flows from the main reservoir 2 through the line 3, the port 4a, the chamber 33, the bore 38, the chamber 39, the chamber 40, the port 4c and the line 7 into the chamber 46 of the trailer valve 8 via the port 8a.

The piston 50 is thus raised together with the valve 52, opening the aperture 53 in the piston 54. The latter is also raised due to the biasing force of the spring 55, enabling the valve 56 to be moved upwardly by the spring 57 until the passageway 58 between the chambers 47 and 59 is closed. Any compressed air contained in the brake cylinders 14 and the line 13 can now escape through the port 8c, the chamber 59 and the aperture 53 in the piston 54 into the chamber 60.

From this chamber such compressed air flows through the line 21 into the chamber 61 of the control valve 20, from the latter past the open valve 62 through the bushing 69 into the chamber 63, and from the latter through the bore 64 to the atmosphere. At the same time, as described hereinabove, the auxiliary reservoir is again charged with air from the main reservoir 2.

If, in contradistinction to the foregoing, the actuating means 15 for the auxiliary brake, i. e. the "motor brake" or "engine brake," is operated without depression of the brake pedal 5, the friction brakes of the tractor are, of course, not actuated but the tractor is nevertheless braked by virtue of the fact that the motor or engine 1 is now acting as a compressor. At the same time, the eccentric 65 of the precision regulating or control valve 20 is displaced through the intermediary of the linkage 17—18—19, which in the illustrated form of the invention is constructed in the manner of a parallelogram linkage, in such a direction that the bushing 67 is displaced downwardly against the force of the spring 68 through the intermediary of the push member 66.

This causes the valve 62 to be moved downwardly until it abuts against its seat in the bushing 69. Only then, upon further downward displacement of the bushing 67, is the valve 70 separated from its seat at the bore 67b against the force of the spring 71, whereby compressed air flows from the main reservoir 2 through the first part of the line 21, the port 20a, the apertures 67a, the chamber 72, the bore 67b, the chamber 61, the port 20b and the second part of the line 21 to the chamber 60 of the trailer valve 8.

Simultaneously, compressed air flows also from the chamber 61 through the bore 74 into the chamber 75 and deflects the diaphragm 76 downwardly against the force of the spring 77. The bushing 69 follows this movement as does the valve combination 62—70 under the force of the spring 71 to such an extent that as soon as a predetermined pressure has been attained in the chamber 75 the valve 70 reaches its seat in the bushing 67, closes the bore 67b and interrupts the flow of compressed air through the control valve 20.

This is the way in which the operating characteristics of the trailer friction brakes are adapted to or matched with the operating characteristics of the "motor brake" which was actuated by suitable operation of the actuating means 15. The above described operation of the control valve 20 may, of course, be varied by suitable adjustment of the screw 78 which controls the action of the spring 77.

On the trailer, in the meantime, the compressed air which has entered the chamber 60 through the port 8d flows from the chamber 60 through the aperture 53 in the piston 54 into the chamber 59 and thence through the port 8c and line 13 into the trailer brake cylinders 14. Thus, it will be seen that the trailer friction brakes are applied, braking the trailer jointly with the tractor, without any concurrent use or application of the tractor friction brakes.

When the "motor brake" is now deactuated, the eccentric 65 is returned to its starting position by the linkage 17—18—19. As a result, the bushing 67 is pressed upwardly by the spring 68 and takes the valve combination 70—62 along to free the opening and central passageway in the bushing 69. Consequently, compressed air from the trailer brake cylinders 14 flows through the line 13, the chamber 59, the aperture 53, the chamber 60 and the aforesaid second part of the line 21 into the chamber 61 of the control valve and from the latter past the valve 62 and through the bushing 69 into the chamber 63, from which it flows into the atmosphere through the bore 64. At the same time, any compressed air in the chamber 75 can flow through the bore 74, the chamber 61, the bushing 69 and the bore 64 to the atmosphere, thus permitting the spring 77 to deflect the diaphragm 76 into the illustrated position, i. e., to dome it upwardly.

Referring now to Fig. 2, it will be seen that those elements of the dual brake system there shown which are identical with some of the elements of the system of Fig. 1 are designated by the same reference numerals. The control valve 20 is thus not shown in detail in Fig. 2, and only the main braking valve and the trailer valve are so illustrated since these differ considerably from the corresponding elements of the system shown in Fig. 1.

The main braking valve 79 is provided with a reciprocally slidable valve member 81 defining a chamber 86 at one end of the cavity in which this valve member is arranged. A chamber 85 is also formed in the housing of the valve 79 and communication between this chamber and the chamber 86 is controlled by a conical valve 83 biased toward its seat by a spring 84 and rigidly connected to a valve head 82 disposed in the chamber 86 for engagement by the valve member 81. The latter is provided with an internal bore 93 communicating with an annular groove 81a.

The line 3 communicates with the chamber 85 of the main braking valve 79 through a port 79a which ports 79b and 79c, communicating with the chamber 86, are connected, respectively, to the line 6 leading to the front and rear brake cylinders (not shown) of the tractor and to the line 7 leading via the shut-off valve 9 and the coupling 10 to the trailer valve 80.

The trailer valve 80 consists of a housing provided with a transverse partition 80' through which extends a central passageway 99 and from the upper surface of which projects an annular partition 80'' which is partly cut away at its lower edge. The upper edge of the partition 80'' constitutes an annular seat 100 which is surrounded by another annular seat 101 concentric and coplanar with the seat 100 and constituted by an internal flange formed in the valve housing. Thus, there are formed within the housing a bottom chamber 91 below the partition 80' and two concentric intermediate chambers 92 and 98 above the partition 80'.

Mounted in the housing and across the seats 100 and 101 is a diaphragm 88 made of any suitable elastic material, this diaphragm defining in the housing an upper chamber 87. A compression spring 97 located in the chamber 87 contacts the outer periphery of the diaphragm 88 and retains the same in contact with the outer seat 101. The diaphragm carries on its upper surface a centrally located abutment member which, when the diaphragm is flat, is spaced from the upper wall of the chamber 87. The housing is provided with a port 80a communicating with both the chamber 87 and the line 7 coming from the main braking valve, a port 80b communicating with both the chamber 91 and the line 11 leading to the auxiliary compressed air reservoir 12, a port 80c communicating with both the chamber 92 and the line 13 leading to the trailer friction brake cylinders 14, and a port 80d communicating with both the chamber 98 and the line 21 coming from the main reservoir 2 via the control valve 20.

Slidably arranged in the inner intermediate chamber 92 adjacent the upper end thereof formed by the partition 80'' is a piston 89 which is provided with a plurality of peripherally spaced apertures 96 and carries a downwardly extending stem 90a which passes through the passageway 99 in the partition 80' and terminates in a conical valve 90 adapted to control this passageway. The valve cone 90 is biased against its seat by a spring 95 located in the chamber 91, whereby the piston is biased in the direction of the lower surface of the diaphragm 88.

As in the embodiment of Fig. 1, the motor or engine 1 is operable as a compressor to brake the tractor independently of the tractor friction brakes by means of suitable actuating means 15 provided with a handwheel 16 and connected by a linkage 17—18—19 to an eccentric of the control valve 20 arranged in the line 21 which bypasses the main braking valve 79.

The operation of the dual brake system according to Fig. 2 is as follows:

As long as the truck or like compound vehicle is being driven, the dual brake system is in the condition illustrated in Fig. 2, whereby the chamber 86 of the main braking valve 79 and thus the lines 6 and 7 are vented to the atmosphere, i. e., subjected to a relatively low pressure, via the inner bore 93 and annular groove 81a of the valve member 81 and the port 94. At the same time, the communication between the chambers 85 and 86 is interrupted by the valve cone 83, and the auxiliary reservoir 12 is being charged with compressed air either by means of a special compressor (not shown) located directly on the trailer or by means of a line (also not shown) extending from the main reservoir directly to the auxiliary reservoir.

Upon depression of the brake pedal 5, which is the conventional braking operation executed by the driver, the lever 25 is pivoted about its pivot axis 26 in the direction of the arrow A to displace the valve member 81 to the right until it abuts against the valve head 82. Upon further movement of the valve member 81, the conical valve 83 is lifted from its seat against the force of the spring 84 and compressed air then flows from the main reservoir 2 through the line 3, the port 79a, the chamber 85, the chamber 86 and the port 79b into the line 6 and thence to the tractor friction brake cylinders.

Simultaneously, compressed air flows from the chamber 86 through the port 79c into the line 7 and thence into the chamber 87 of the trailer valve 80. As a result, the diaphragm 88 is deflected downwardly, whereby the piston 89 and the attached valve 90 are also displaced downwardly. Compressed air thus is permitted to flow from the auxiliary reservoir 12 through the line 11, the port 80b, the chamber 91, the passageway 99, the chamber 92, the port 80c and the line 13 to the trailer friction brake cylinders 14, whereby the trailer friction brakes are applied together with the tractor friction brakes.

When the brake pedal 5 is released, the piston-like valve member 81 in the main braking valve 79 is again displaced to the left, permitting the spring 84 to force the valve 83 against its seat interrupting the communication between the chambers 85 and 86. Simultaneously, the valve head 82 is separated from the valve member 81, freeing the bore 93, whereby compressed air can escape from the lines 6 and 7 through the chamber 86, the bore 93, the annular groove 81a and the port 94 into the atmosphere.

In the meantime, in the trailer valve 80 the spring 95 forces the valve 90 to its position closing the passageway 99. Compressed air present in the line 13 and in the chamber 92 now flows through the bores 96 in the piston 89, lifts the central portion of the diaphragm 88 from the seat 100 (until the abutment 102 contacts the upper wall of the chamber 87) and enters the annular chamber 98 from which it escapes to the atmosphere through the port 80d, the line 21 and the bore 64 in the control valve 20, as described hereinabove with respect to Fig. 1.

Upon actuation of the "motor brake" through operation of the handwheel 16 (it being remembered that any auxiliary brake independent of the engine and of the tractor friction brakes may be used) to brake the tractor without applying the tractor friction brakes, the linkage 17—18—19 operates the control valve 20 in the manner described hereinabove, so that compressed air flows from the main reservoir 2 through the first part of the line 21, the control valve 20, the second part of the line 21 and the port 80d into the chamber 98 of the trailer valve 80.

By virtue of the pressure of the air now in this chamber, the center of the diaphragm 88 is lifted off the seat 100 and domed upwardly at most until the abutment 102 engages the upper wall of the chamber 87, permitting the compressed air to flow through the bores 96 of the piston 89 into the chamber 92 and thence through the port 80c into the line 13 and the trailer brake cylinders 14.

When the operation of the auxiliary tractor brake is terminated, which, of course, means returning of the control valve 20 to its starting position (see Fig. 1), compressed air flows in the opposite direction from the trailer brake cylinders 14 and line 13 through the chamber 92 and the bores 96 in the piston 89, lifts the diaphragm 88 off its seat 100, and then flows through the chamber 98 and the line 21 to the control valve 20 where it escapes to the atmosphere in the above described manner through the bore 64.

It will, of course, be realized that in both the embodiments of the dual brake system according to the invention the matching of the operational characteristics of the auxiliary tractor brake with the operational characteristics of the trailer friction brakes may be extended over different ranges than afforded by the spring 77 and adjustment means 78 through provision of an additional pressure limiting valve (not shown) in the line 21 between the control valve 20 and the trailer valve 8 or 80.

From the foregoing it will be appreciated that in its broadest sense the present invention provides a dual brake system for a compound, road-riding vehicle including a tractor and at least one trailer attached thereto, wherein both the tractor and the trailer are equipped with friction brake means while the tractor is additionally equipped with auxiliary brake means (constituted either by the engine drivable as a compressor or by some other type of independent brake of conventional construction) operable entirely independently of the tractor friction brake means. In essence, the dual brake system is characterized by the fact that it includes brake-operating means (the line 21 and the control valve 20 connected to the trailer valve 8 or 80) operatively connected to the trailer friction brake means 14 and responsive (via the linkage 17—18—19) to actuation of the auxiliary brake means 1 (by means of the actuating means 15—16), whereby, upon operation of the auxiliary brake means to brake the tractor without concurrent operation of the tractor friction brake means, the trailer friction brake means are automatically operated.

Having thus described the invention, what is claimed as new and desired to be secured by Letters Patent is:

1. In a compound, road-riding automotive vehicle including a tractor and at least one trailer attached thereto, said tractor being equipped with friction brake means and with auxiliary brake means operable independently of said tractor friction brake means, said trailer being equipped with friction brake means; first brake-operating means for simultaneously operating said tractor friction brake means and said trailer friction brake means, second brake-operating means operatively connected to said trailer friction brake means for actuating said trailer friction brake means independently of said tractor friction brake means and responsive to actuation of said auxiliary brake means, whereby, upon operation of the latter to brake said tractor without concurrent operation of said tractor friction brake means, said trailer friction brake means are automatically operated.

2. In a compound, road-riding automotive vehicle including a tractor equipped with friction brake means and with separate auxiliary brake means for braking said tractor without operation of said friction brake means thereof, at least one trailer attached to said tractor and equipped with friction brake means, and first means for simultaneously operating said tractor friction brake means and said trailer friction brake means; the improvement comprising second means for operating said trailer friction brake means independently of said tractor friction brake means, and third means responsive to operation of said auxiliary brake means and connected to said second means for controlling the latter and thus operation of said trailer friction brake means, without concurrent operation of said tractor friction brake means, in dependence on the operation of said auxiliary brake means.

3. In a compound, road-riding automotive vehicle including a tractor equipped with fluid pressure-operated friction brake means and with separate auxiliary brake means for braking said tractor without operation of said friction brake means thereof, at least one trailer attached to said tractor and equipped with fluid pressure-operated friction brake means, and a main fluid pressure system for simultaneously operating said tractor friction brake means and said trailer friction brake means, said main fluid pressure system including a trailer valve for controlling the flow of pressure fluid to said trailer friction brake means, and a main braking valve for controlling both the flow of pressure fluid to said tractor friction brake means and the pressure applied to said trailer valve; the improvement comprising a secondary fluid pressure system bypassing said main braking valve and connected to said trailer valve for operating said trailer friction brake means independently of said tractor friction brake means, and means responsive to operation of said auxiliary brake means and connected to said secondary fluid pressure system for controlling the latter and thus operation of said trailer friction brake means, without concurrent operation of said tractor friction brake means, in dependence on the operation of said auxiliary brake means.

4. In a compound vehicle according to claim 3; actuating means for and operatively connected to said auxiliary brake means, said responsive means comprising a control valve incorporated in said secondary fluid pressure system, and coupling means operatively connected to both said actuating means and said control valve and constructed for matching the operating characteristics of said trailer friction brake means with the operating characteristics of said auxiliary brake means.

5. In a compound, road-riding automotive vehicle including a tractor driven by an internal combustion engine, and a trailer attached to said tractor, said tractor and said trailer being equipped with fluid pressure-operated friction brake means, respectively, said engine being selectively operable as a compressor to constitute auxiliary brake means for said tractor entirely independent of said tractor friction brake means; the combination with a pressure-actuatable trailer valve for controlling the flow of pressure fluid to said trailer friction brake means, of a first fluid pressure system comprising first conduit means communicating with said tractor friction brake means and with said trailer valve, and a main braking valve incorporated in said first conduit means for controlling the flow of pressure fluid to said tractor friction brake means and for concurrently controlling the pressure applied to said trailer valve through said first conduit means, a second fluid pressure system comprising second conduit means bypassing said main braking valve and communicating with said trailer valve, and a control valve incorporated in said second conduit means for controlling the flow of pressure fluid to said trailer valve and therethrough to said trailer friction brake means, and manipulating means operatively connected to both said engine and said control valve for predetermining the operation of said engine as a compressor and for jointly therewith operating said control valve, whereby upon operation of said main braking valve to apply said tractor friction brake means the pressure on said trailer valve is changed to permit flow of pressure fluid to said trailer friction brake means, while upon operation of said engine as a compressor said tractor is braked without use of said tractor friction brake means while said control valve is operated to cause flow of pressure fluid to and through said trailer valve to said trailer friction brake means.

6. In a compound vehicle according to claim 5; a main reservoir for pressure fluid located on said tractor and communicating with both said first and second conduit means, said main braking valve and said control valve being connected in said first and second conduit means, respectively, between said main reservoir and said trailer valve, and an auxiliary reservoir for pressure fluid located on said trailer and connected to said trailer valve for communication therethrough with said trailer friction brake means.

7. In a compound vehicle according to claim 6; a parallelogram linkage interconnecting said manipulating means and said control valve to ensure operation of the latter in a predetermined relationship to the operation of said manipulating means and thus of said engine as a compressor, whereby the braking action of the latter is matched to the braking action of said trailer friction brake means.

8. In a compound, road-riding automotive vehicle including a tractor equipped with a first set of fluid pressure-operated friction brakes having respective brake cylinders, and at least one trailer attached to said tractor and equipped with a second set of fluid pressure-operated friction brakes having respective brake cylinders, said tractor being further equipped with auxiliary brake means acting entirely independently of said first set of friction brakes; a main source of pressure fluid on said tractor, first conduit means interconnecting said main source of pressure fluid and said brake cylinders of said first set of friction brakes, a main braking valve on said tractor and in said first conduit means for controlling the latter and thus actuation of said first set of friction brakes, an auxiliary source of pressure fluid on said trailer, second conduit means interconnecting said auxiliary source of pressure fluid and said brake cylinders of said second set of friction brakes, a trailer valve in said second conduit means for controlling the latter and thus actuation of said second set of friction brakes, third conduit means interconnecting said main braking valve and said trailer valve and normally maintained in communication with said main source of pressure fluid by said main braking valve, fourth conduit means bypassing said main braking valve and interconnecting said main source of pressure fluid and said trailer valve, a control valve in said fourth conduit means and controlling the flow of pressure fluid from said main source thereof to said trailer valve, and actuating means operatively connected to both said auxiliary brake means and said control valve for jointly operating the same, whereby upon operation of said main braking valve to actuate said first set of friction brakes said third conduit means is isolated from said main source of pressure fluid and vented to the atmosphere to reduce the pressure on a part of said trailer valve and permit flow of pressure fluid therethrough from said auxiliary source to said brake cylinders of said second set of friction brakes to actuate the latter together with said first set of friction brakes, while upon operation of said auxiliary brake means to brake said tractor without concurrent operation of said main braking valve said control valve is operated to permit flow of pressure fluid from said main source to said trailer valve and therethrough to said brake cylinders of said second set of friction brakes for actuation of the latter without actuation of said first set of friction brakes.

9. In a vehicle according to claim 8; coupling means connected to both said actuating means and said control valve and establishing the operative connection therebetween, said coupling means comprising eccentric means for operating said control valve, and transmission means for imparting to said eccentric means valve-operating motions corresponding to the operation of said actuating means.

10. In a compound, road-riding automotive vehicle including a tractor having a main braking valve, first friction brake means and auxiliary brake means operable independently of said first friction brake means, and at least one trailer attached to said tractor and having second friction brake means; a main pressure fluid reservoir on said tractor, first conduit means connecting said main reservoir with said main braking valve and therethrough with said first friction brake means, an auxiliary pressure fluid reservoir on said trailer, second conduit means connecting said auxiliary reservoir with said second friction brake means, a trailer valve incorporated in said second conduit means for controlling the latter and thus flow of pressure fluid from said auxiliary reservoir to said second friction brake means, third conduit means connecting said main braking valve and said trailer valve and normally vented to the atmosphere by said main braking valve, fourth conduit means bypassing said main braking valve and connecting said main reservoir with said trailer valve, a control valve incorporated in said fourth conduit means, and actuating means operatively connected to both said auxiliary brake means and said control valve for jointly operating the same, whereby upon operation of said main braking valve to actuate said first friction brake means said third conduit means is isolated from the atmosphere and placed into communication with said main reservoir to subject said trailer valve to an increase in pressure and to thereby operate said trailer valve to permit flow of pressure fluid from said auxiliary reservoir to said second friction brake means for actuation of the latter together with said first friction brake means, while upon operation of said auxiliary brake means to brake said tractor without concurrent operation of said main braking valve said control valve is operated to permit flow of pressure fluid directly from said main reservoir to said trailer valve and therethrough to said second friction brake means for actuation of the latter without actuation of said first friction brake means.

11. In a vehicle according to claim 10; coupling means connected to both said actuating and said control valve and establishing the operative connection therebetween, said coupling means comprising eccentric means for operating said control valve, and transmission means for imparting to said eccentric means valve-operating motions corresponding to the operation of said actuating means.

References Cited in the file of this patent

UNITED STATES PATENTS

| | | |
|---|---|---|
| 1,861,534 | Kazenmaier | June 7, 1932 |
| 2,451,139 | Williams et al. | Oct. 12, 1948 |